(12) United States Patent
Haverdings

(10) Patent No.: US 8,272,599 B2
(45) Date of Patent: Sep. 25, 2012

(54) CONTROL LEVER ASSEMBLY FOR A TILT-ROTOR AIRCRAFT

(75) Inventor: Hendrik Haverdings, Velserbroek (NL)

(73) Assignee: Stichting Nationaal Lucht-en Ruimtevaart Laboratorium, Amsterdam (NL)

( * ) Notice: Subject to any disclaimer, the term of this patent is extended or adjusted under 35 U.S.C. 154(b) by 796 days.

(21) Appl. No.: 12/466,517

(22) Filed: May 15, 2009

(65) Prior Publication Data
US 2009/0283644 A1    Nov. 19, 2009

(30) Foreign Application Priority Data

May 15, 2008 (EP) ..................................... 08103976

(51) Int. Cl.
*B64C 13/04* (2006.01)
*B64C 27/22* (2006.01)

(52) U.S. Cl. ............................................ 244/221; 244/6

(58) Field of Classification Search .................. 244/56, 244/99.2, 99.3, 221, 223, 12.4, 6, 237, 220, 244/7 R
See application file for complete search history.

(56) References Cited

U.S. PATENT DOCUMENTS

| | | | |
|---|---|---|---|
| 2,321,572 A | | 6/1943 | Campbell |
| 2,702,168 A | * | 2/1955 | Platt .............................. 244/7 R |
| 3,106,369 A | | 10/1963 | Borst |
| 3,179,352 A | * | 4/1965 | Nelson .......................... 244/7 C |
| 3,197,157 A | * | 7/1965 | King .............................. 244/7 C |
| 3,360,219 A | | 12/1967 | Wigal |
| 3,514,052 A | * | 5/1970 | McKeown .................... 244/12.3 |
| 3,572,612 A | * | 3/1971 | Irbitis ............................ 244/7 C |
| 3,572,614 A | * | 3/1971 | Bertelsen ...................... 244/12.1 |
| 4,059,247 A | * | 11/1977 | Prewitt ......................... 244/7 R |
| 5,839,691 A | * | 11/1998 | Lariviere ...................... 244/7 R |
| 6,254,037 B1 | * | 7/2001 | Fenny et al. .................. 244/223 |
| 6,644,588 B2 | * | 11/2003 | King et al. .................... 244/7 A |
| 6,655,631 B2 | * | 12/2003 | Austen-Brown ............. 244/12.4 |
| 6,695,264 B2 | * | 2/2004 | Schaeffer et al. ............. 244/223 |
| 2002/0153452 A1 | * | 10/2002 | King et al. ....................... 244/56 |
| 2003/0094537 A1 | * | 5/2003 | Austen-Brown ............. 244/7 R |
| 2003/0094539 A1 | * | 5/2003 | Schaeffer et al. ........... 244/17.13 |
| 2005/0211826 A1 | | 9/2005 | Pai |

FOREIGN PATENT DOCUMENTS

GB    2355439 A    4/2001

OTHER PUBLICATIONS

Official Search Report of the European Patent Office in counterpart foreign application No. 08103976.0 filed May 15, 2008.

* cited by examiner

*Primary Examiner* — Benjamin P Lee
(74) *Attorney, Agent, or Firm* — Steven M. Koehler; Westman, Champlin & Kelly, P.A.

(57) ABSTRACT

A control lever assembly for a tilt-rotor aircraft, comprises at least one control lever which is movable relative to a control lever support. The control lever support has a rotational position that varies in correspondence with the tilt of the rotor of the aircraft. For example, the control lever support is movable by an actuator between a first position, in the airplane mode of the aircraft, in which the control lever moves substantially horizontally and a second position, in the helicopter mode of the aircraft, in which the control lever moves substantially vertically.

22 Claims, 3 Drawing Sheets

CONTROL LEVER ASSEMBLY FOR A TILT-ROTOR AIRCRAFT

BACKGROUND

The discussion below is merely provided for general background information and is not intended to be used as an aid in determining the scope of the claimed subject matter.

In a tilt-rotor aircraft the engine nacelles can be rotated from a position in which the engine thrust is directed substantially horizontally and backwards and the aircraft is in an airplane mode, towards a position in which the engine thrust is directed substantially vertically and downwards and the aircraft is in a helicopter mode. In both modes the control lever assembly is used to control the engines, aided by a special power and thrust management system. Depending on the respective mode (airplane mode, helicopter mode or conversion mode) the power and thrust management system will in a predefined manner control the engines (especially the rotor rpm and engine power output) based upon the position of the control lever(s) relative to the control lever support.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

One aspect herein described is a control lever assembly where a control lever support has a rotational position that varies in correspondence with the tilt of the rotor of the aircraft.

Whereas in a conventional tilt-rotor aircraft the control lever support has a fixed position (generally in accordance with a conventional rotorcraft or helicopter, such that the control lever may be moved up or down for the control of the rotor blade collective pitch angle), the position of the control lever support herein described can vary in accordance with the tilt of the rotor (or, in other words, according to the mode of the aircraft). As a result the control lever position and the control lever movement will correspond better with such positions and movements in accordance with both a conventional airplane and a conventional helicopter. This will increase the 'natural' feel to the pilot, when in the airplane mode and helicopter mode, but also in a conversion mode. Furthermore the rotational position of the control lever support (and control lever) will provide the pilot with a visible and tactile indication of the tilt position of the rotors/nacelles.

In one embodiment, the control lever support is movable by an actuator between a first position, in the airplane mode of the aircraft, in which the control lever moves substantially horizontally, and a second position, in the helicopter mode of the aircraft, in which the control lever moves substantially vertically. In accordance with such an embodiment, the control lever assembly in both modes closely mimics the respective position of such control lever assemblies in conventional airplanes and conventional helicopters. In combination with a power and thrust management system well known in such types of aircraft, a quite conventional control of the aircraft can be achieved in both modes of operation. The actuator can automatically provide the position of the control lever support in correspondence with the present flight mode of the aircraft.

In accordance with yet another embodiment of the control lever assembly, the control lever support comprises a housing pivotally connected to the remainder of the aircraft through a horizontally and transversally extending pivot axis. The housing will rotate around the pivot axis between its first and second positions corresponding to the airplane mode and helicopter mode, respectively.

The rotation of the housing may be realised in different ways. For example the rotation of the housing may be affected by a linear actuator, such as for example a cylinder/piston assembly, connected to another portion of the aircraft and to a part of the housing distanced or remote from the pivot axis. However, as an alternative it is possible too that the rotation of the housing is caused by a rotary actuator positioned at the pivot axis.

In an advantageous embodiment of the control lever assembly the friction force experienced by the control lever during rotation of the control lever support can be selectively or temporarily increased. When the control lever support (together with the control lever) rotates to a new position indicative of rotation of the engine nacelles or tilt of the rotors, the increased friction enables the control lever to exert a force on the hand of the pilot without said control lever moving relative to the control lever support (and thus without changing the setting of the engine(s)). Thus the pilot receives tactile feedback of the rotation of the engine nacelles. Basically such a friction provides the pilot with a feel as if the control lever is fixed to the control lever support. But the pilot will be able to overcome such friction, however, using a larger force than needed to move the control lever when the control lever support is not rotating.

In one embodiment, the friction force is programmable, such that the force to overcome the friction ('breakout force') can be set.

In an embodiment of the control lever assembly, the control lever can rotate around a rotation axis defined by the control lever support. Thus the control lever follows a curved path, such as an arc shaped path. In such an embodiment the rotation axis does not coincide with the pivot axis of the control lever support. It is noted, however, that it is also possible that the control lever translates, following a straight path.

The control lever can be provided with at least one manually operable control switch. The pilot then can operate aircraft systems without removing his hand from the control lever. For example, at least one control switch may be used for selecting the tilt of the rotor/nacelles of the aircraft.

Further, the control lever assembly can include a control unit for determining the tilt of the engine nacelle and, based thereon, providing a control signal for the actuator for rotating the control lever support. For example, a tilt sensor may be provided feeding a tilt signal to the control unit. It is noted however, that a mechanical connection between the nacelles and the control lever support or an actuator therefore also comprises another embodiment having one or more aspects of the present invention.

BRIEF DESCRIPTION OF THE FIGURES

Hereinafter the invention will be elucidated while referring to the drawing in which.

DETAILED DESCRIPTION OF THE ILLUSTRATIVE EMBODIMENT

Figure 1:
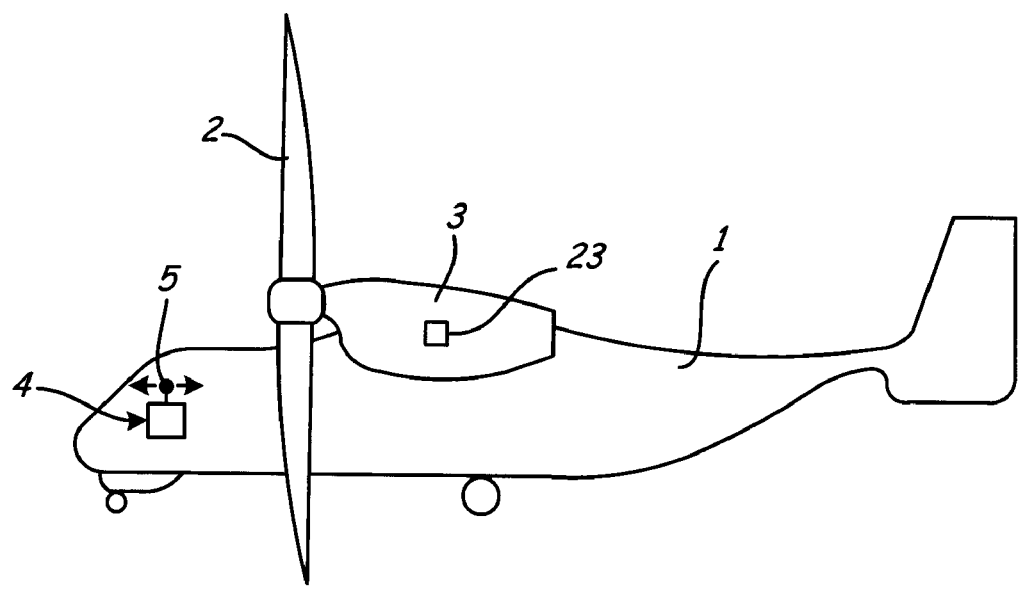
FIG. 1 schematically shows a tilt-rotor aircraft in an airplane mode.
Figure 2:
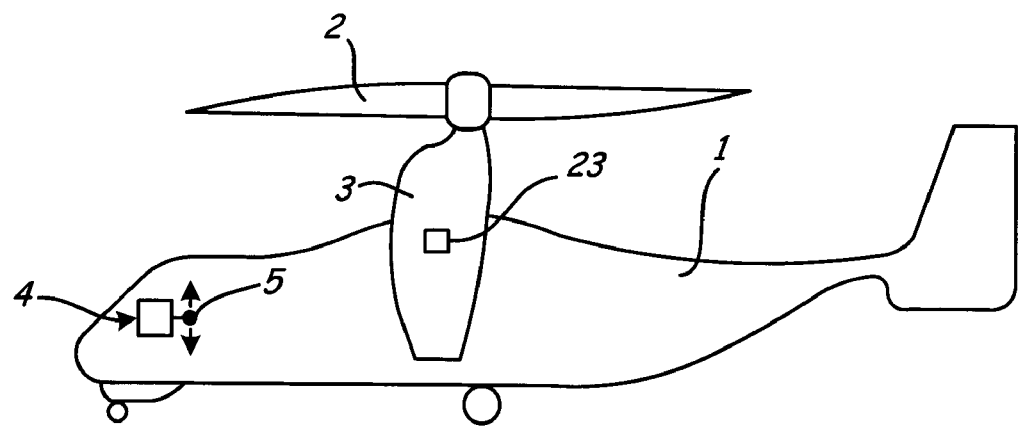
FIG. 2 schematically shows the tilt-rotor aircraft in a helicopter mode.

Firstly referring to FIGS. 1 and 2, a tilt-rotor aircraft 1 is illustrated schematically in outlines. In FIG. 1 the aircraft is in an airplane mode in which each rotor 2 faces substantially forward for creating a forward thrust for propelling the aircraft 1 in normal flight. In such an airplane mode the engine nacelles 3 substantially extend horizontally relative to a body having a cockpit. In FIG. 2 the aircraft is in a helicopter mode in which each rotor 2 faces substantially upward for creating an upward thrust for hovering the aircraft 1, mainly during take-off and landing. In such a helicopter mode the engine nacelles 3 substantially extend vertically.

Between the airplane mode and helicopter mode the aircraft will be in a conversion mode in which the rotor 2 (or nacelle 3) is inclined.

In the cockpit of the aircraft 1 a control lever assembly 4 with control lever 5 have been indicated schematically (it is noted that multiple control levers may be provided). In the airplane mode (FIG. 1) the orientation of the control lever assembly 4 is such that for controlling the operation of the engines of the aircraft the control lever 5 is guided to move substantially horizontally forward or rearward (as indicated by the short arrows). For example, when the control lever rotates around a rotation axis, such guided movement actually occurs along an arc of a circle. In the helicopter mode (FIG. 2), the orientation of the control lever assembly 4 is such that for controlling the operation of the engines of the aircraft the control lever 5 is guided to move substantially vertically upward or down-ward (as indicated by the short arrows). For example, when the control lever 5 rotates around a rotation axis, such guided movement actually occurs along an arc of a circle.

The different orientation of the control lever assembly 4 in different flight modes offers a pilot a control lever assembly with a control lever 5 movement similar to what is known from conventional airplanes and helicopters, respectively, and this offers a 'natural' control in both modes.

Generally, although not shown here, in both modes the control lever assembly will be used to control the engines in combination with a power and thrust management system well known in such aircraft, the details of which are not necessary for this description. Generally, depending on the respective mode (airplane mode, helicopter mode or conversion mode) the power and thrust management system will in a predefined manner control the engines (especially the rotor rpm and engine power output) based upon the position of the control levers relative to the control lever support.

Figure 3:
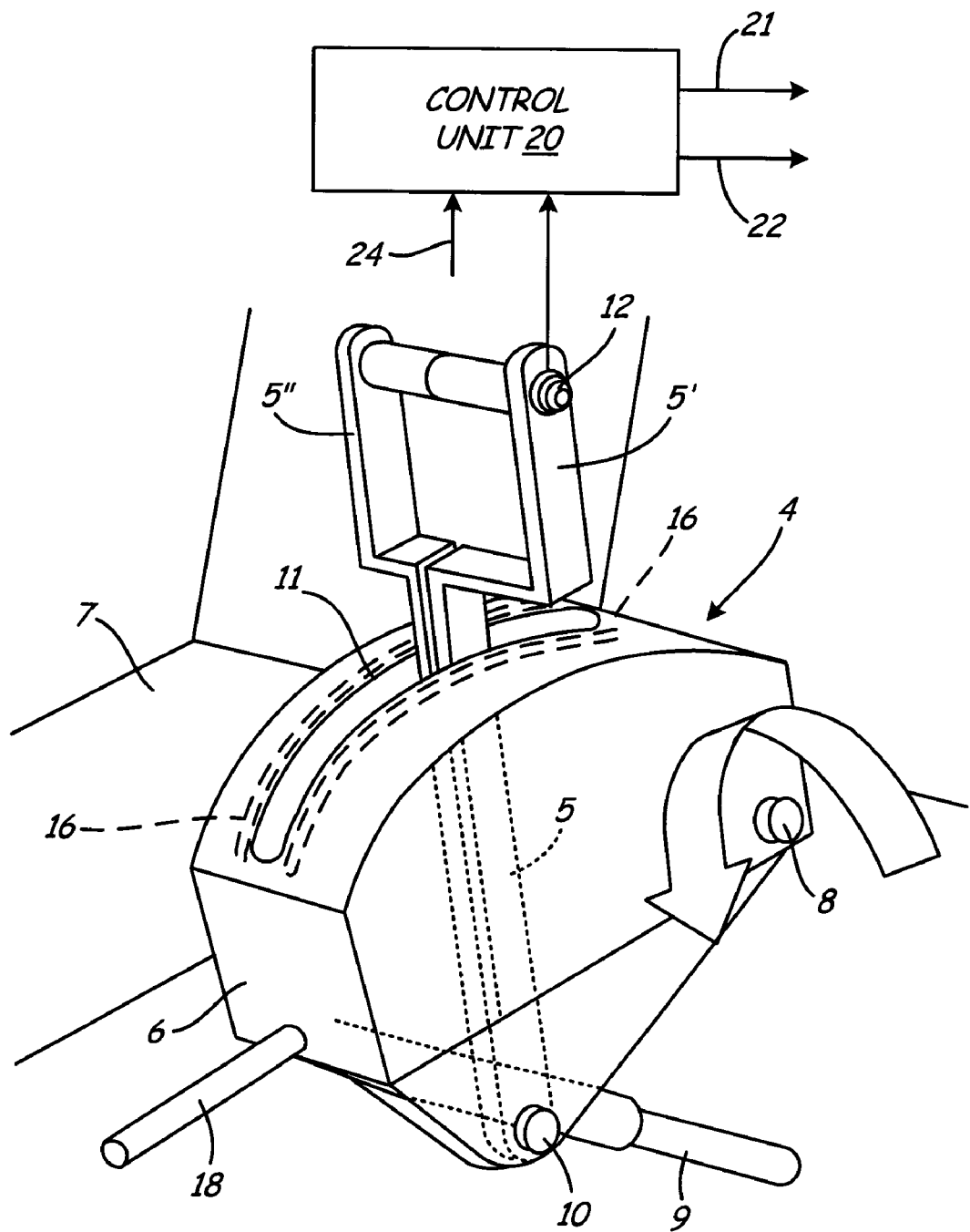
FIG. 3 schematically and perspectively shows an embodiment of a control lever assembly according to the invention.

As will be elucidated while referring to FIG. 3 the control lever 5 of the control lever assembly 4 for the tilt-rotor aircraft 1 is movably mounted in a control lever support that has a rotational position that varies in correspondence with the tilt of the rotor 2 of the aircraft 1. The control lever support comprises a housing 6 movably, for example, pivotally, connected to the remainder of the aircraft (for example a central console 7 in the cockpit) such as through a horizontally and transversally (with respect to the aircraft) extending pivot axis 8. Guided rotational movement of the control lever support or housing 6 generally corresponds to movement of the engine nacelles 3 or rotors. Rotational movement of the control lever support or housing 6 can be at a fixed radius such as about a stationary pivot axis 8, or such movement can include a translational component, for example due to any translational movement of the pivot axis 8.

Figure 4:
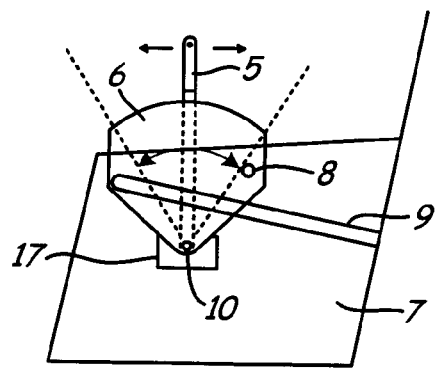
FIGS. 4-6 show different positions of the control lever assembly of FIG. 3 in a schematical side elevational view.
Figure 5:
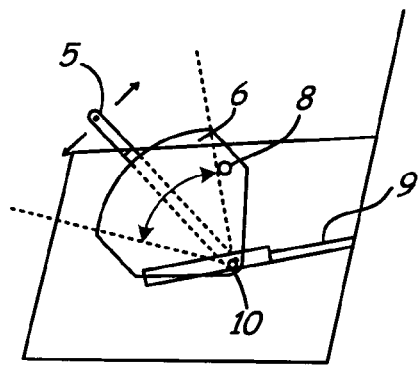
Figure 6:
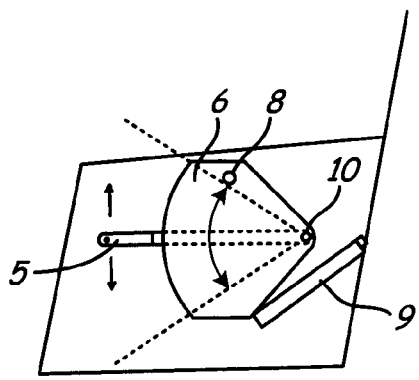

The control lever support or housing 6 is movable by an actuator 9 between a first position (FIG. 4) indicative of the aircraft 1 in the airplane mode, in which the control lever 5 moves substantially horizontally and a second position (FIG. 6) indicative of the aircraft in the helicopter mode, in which the control lever 5 moves substantially vertically.

In the illustrated embodiment, the rotation of the housing 6 is caused by an actuator 9, such as for example a linear actuator, for instance, a cylinder/piston assembly operable with fluid (air or liquid), connected with its one end to the remainder of the aircraft and with its other opposite end to a part of the housing 6 distanced from the pivot axis 8. Other forms of actuators such as electric actuators can also be used.

In yet an alternative embodiment, however, the rotation of the housing 6 may be caused for example by a rotary actuator (e.g. fluid or electric) 13 (FIG. 7) positioned at the pivot axis 8.

Figure 7:
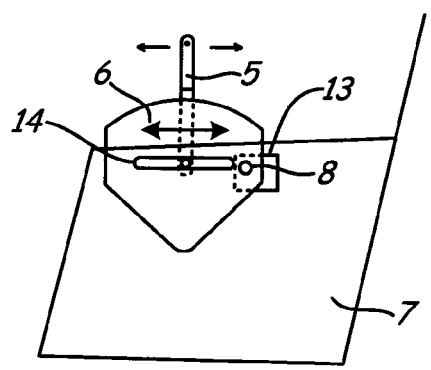
FIG. 7 schematically shows a slide controlling movement of a control lever.

In one embodiment, the control lever 5 can rotate around a rotation axis 10 defined by (or in) the control lever support or housing 6. As a result the control lever 5 will follow an arc shaped path with its free end. However, it should be understood that movement of the control lever 5 is not limited to an arc shaped path. Rather, movement of the control lever 5 can take a curved path or even a straight path. Hence, guided movement of the control lever 5 relative to the housing 6 can be provided with slides, levers, cams and the like to follow any desired curved or straight path. FIG. 7 schematically illustrates the control lever 5 moveable using a slide 14.

In the illustrated embodiment of the control lever assembly, the rotation axis 10 of the control lever 5 does not coincide with the pivot axis 8 of the housing 6.

In a further embodiment, means are provided for selectively increasing the friction force experienced by the control lever 5 during rotation of the control lever support or housing 6. Such means for example could comprise one or more movable friction plates 16 (schematically illustrated in FIG. 3) incorporated in the side(s) of a slot 11 in the housing 6 through which the control lever 5 extends. Such friction plate(s) 16 then could be moved closer to the control lever 5 (and each other) using a suitable actuator (e.g. fluid or electric) for increasing the friction, and be moved away from control lever 5 for decreasing or even eliminating such friction. Another way of providing the required friction force characteristics is by using a programmable angular position/speed-torque rotary actuator (e.g. fluid or electric) 17 (FIG. 4) at the control lever rotation axis 10.

When the control lever support or housing 6 (together with the control lever 5) rotates to a new position the increased friction enables the control lever 5 to exert a force on the hand of the pilot without said control lever 5 moving relative to the control lever support (and thus without changing the setting of the engine). Thus the pilot receives tactile feedback of the rotation of the engine nacelles (or rotor 2). Basically such a friction provides the pilot with a feel as if the control lever 5 is fixed to the control lever support or housing 6. The pilot will be able to overcome such friction, however using a larger force than needed to move the control lever 5 when the control lever support or housing 6 is not rotating.

As illustrated in FIG. 3 the control lever 5 is provided with at least one manually operable control switch 12 for selecting the tilt of the rotor 2 of the aircraft 1. Operating said switch will lead to a movement (rotation around a transverse axis of the aircraft 1) of the rotor 2 (and nacelle 3) and, through an automatic activation of the actuator 9, to a corresponding rotation of the housing 6 around pivot axis 8.

It is noted however, that a mechanical connection between the nacelles and the control lever support or an actuator therefore also comprises another embodiment having one or more aspects of the present invention. In FIG. 3, the mechanical connection is schematically represented by cable 18 although levers, slides, rods, cams etc. can be used in addition or in any suitable combination as appreciated by those skilled in the art.

Also other switches or control means may be provided on the control lever 5 (e.g. a force trim release switch or a flap angle switch).

A control unit 20 for determining the tilt of the rotor 2 can receive signals from switch 12 and/or other inputs, for example, a tilt sensor 23 operably coupled to the engine nacelles 3 for providing a tilt signal 24 to the control unit 20, and provides control signals such as a control signal 21 for the actuators 9 or 13 for rotating the control lever support or housing 6, and/or a control signal 22 for increasing friction upon the control lever 5. Such a control unit 20 may be part of a computer system already present in the aircraft 1.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims. Thus, for example, the control lever assembly may be provided with two control levers as indicated in FIG. 3 by the reference numbers 5' and 5".

What is claimed is:

1. A control lever assembly for a tilt-rotor air-craft, comprising at least one control lever which is movable relative to a control lever support, wherein the control lever support is configured for rotational movement and wherein its rotational position varies in correspondence with the tilt of the rotor of the aircraft, and an actuator configured to move the control lever support between a first position in which the control lever moves substantially horizontally and a second position in which the control lever moves substantially vertically.

2. The control lever assembly according to claim 1, wherein the control lever support comprises a housing pivotally connected to another portion of the aircraft through a horizontally and transversally extending pivot axis.

3. The control lever assembly according to claim 2, wherein actuator comprises a linear actuator connected connected to said another portion of the aircraft and to a part of the housing remote from the pivot axis.

4. The control lever assembly according to claim 2, wherein actuator comprises a rotary actuator positioned at the pivot axis.

5. The control lever assembly according to claim 1, and further comprising an element operably coupled to the control lever to selectively increase friction force experienced by the control lever during rotation of the control lever support.

6. The control lever assembly according to claim 5, wherein the friction force is programmable.

7. The control lever assembly according to claim 1, wherein the control lever pivots around a rotation axis defined by the control lever support.

8. The control lever assembly according to claim 7 wherein the control lever support comprises a housing pivotally connected to another portion of the aircraft through a horizontally and transversally extending pivot axis, and wherein the rotation axis does not coincide with the pivot axis.

9. The control lever assembly according to claim 1, wherein the control lever is provided with at least one manually operable control switch.

10. The control lever assembly according to claim 9, wherein said at least one control switch comprises a switch configured to provide a signal indicative of selecting the tilt of the rotor of the aircraft.

11. The control lever assembly according to claim 1, and further comprising a control unit configured to provide a control signal for controlling the actuator for rotating the control lever support.

12. An aircraft comprising: a body having a cockpit; an engine tiltable relative to the body; and a control lever assembly disposed in the cockpit for use by a pilot having at least one control lever which is movable relative to a control lever support, wherein the control lever support has a rotational position that varies in correspondence with the tilt of the engine of the aircraft, and an actuator configured to move the control lever support between a first position in which the control lever moves substantially horizontally and a second position in which the control lever moves substantially vertically.

13. The aircraft according to claim 12, wherein the control lever support comprises a housing pivotally connected to another portion of the aircraft through a horizontally and transversally extending pivot axis.

14. The aircraft according to claim 13, wherein the actuator comprises a linear actuator connected to said another portion of the aircraft and to a part of the housing remote from the pivot axis.

15. The aircraft according to claim 13, the actuator comprises a rotary actuator positioned at the pivot axis.

16. The aircraft according to claim 12, and further comprising an element operably coupled to the control lever to selectively increase friction force experienced by the control lever during rotation of the control lever support.

17. The aircraft according to claim 16, wherein the friction force is programmable.

18. The aircraft according to claim 12, wherein the control lever pivots around a rotation axis defined by the control lever support.

19. The aircraft according to claim 18 wherein the control lever support comprises a housing pivotally connected to another portion of the aircraft through a horizontally and transversally extending pivot axis, and wherein the rotation axis does not coincide with the pivot axis.

20. The aircraft according to claim 12, wherein the control lever is provided with at least one manually operable control switch.

21. The aircraft according to claim 20, wherein said at least one control switch comprises a switch configured to provide a signal indicative of selecting the tilt of the engine of the aircraft.

22. The aircraft according to claim 12, and further comprising a control unit configured to provide a control signal for controlling the actuator for rotating the control lever support.

* * * * *

UNITED STATES PATENT AND TRADEMARK OFFICE
CERTIFICATE OF CORRECTION

| | | |
|---|---|---|
| PATENT NO. | : 8,272,599 B2 | |
| APPLICATION NO. | : 12/466517 | |
| DATED | : September 25, 2012 | |
| INVENTOR(S) | : Hendrik Haverdings | |

It is certified that error appears in the above-identified patent and that said Letters Patent is hereby corrected as shown below:

In The Claims

Column 5, Claim 3:

In line 48, delete "actuator connected connected to said" and insert -- actuator connected to said --

Signed and Sealed this
Tenth Day of May, 2016

Michelle K. Lee
*Director of the United States Patent and Trademark Office*